UNITED STATES PATENT OFFICE.

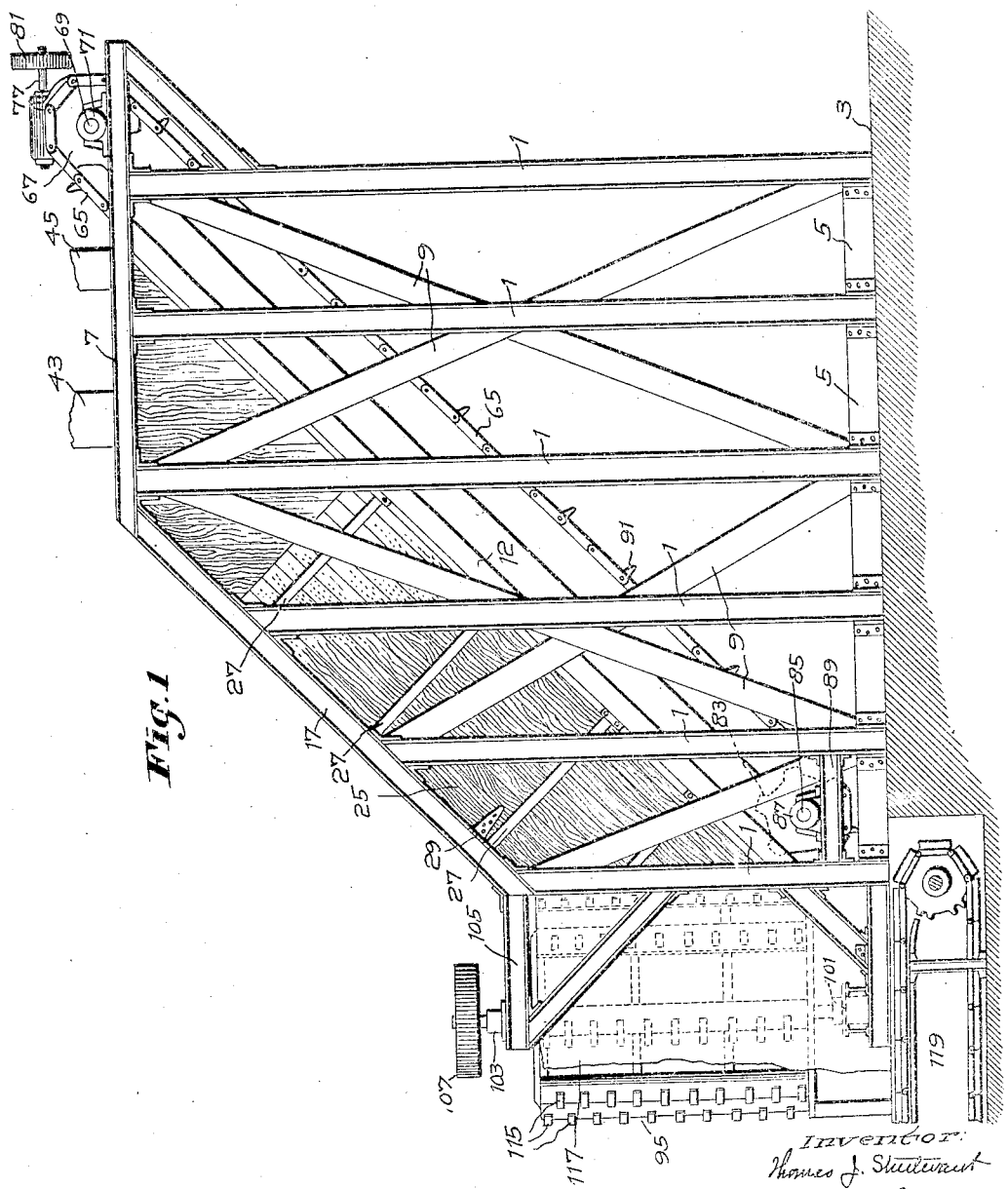

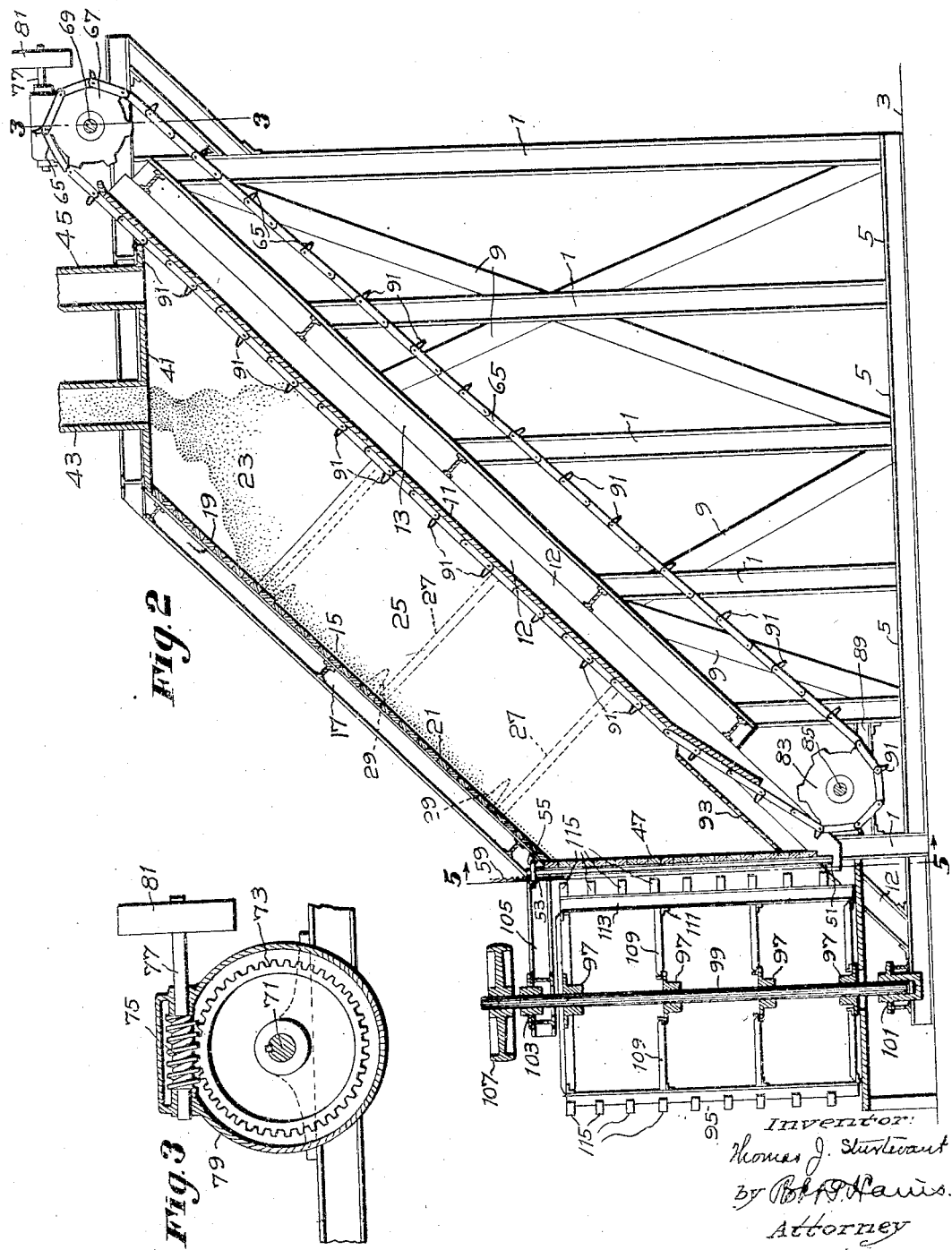

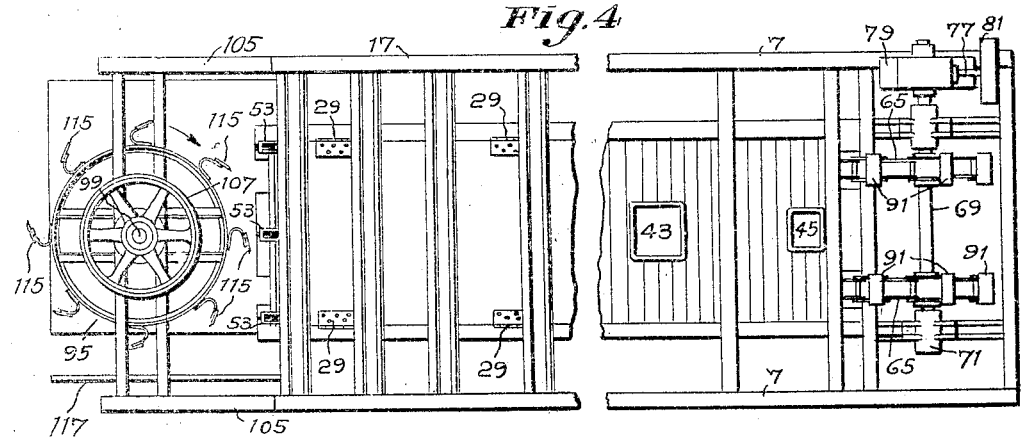
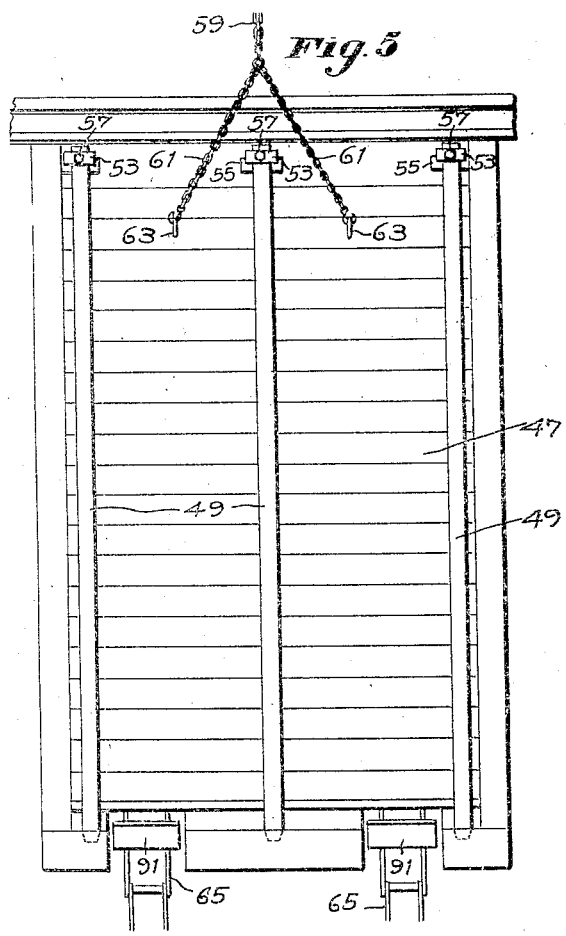
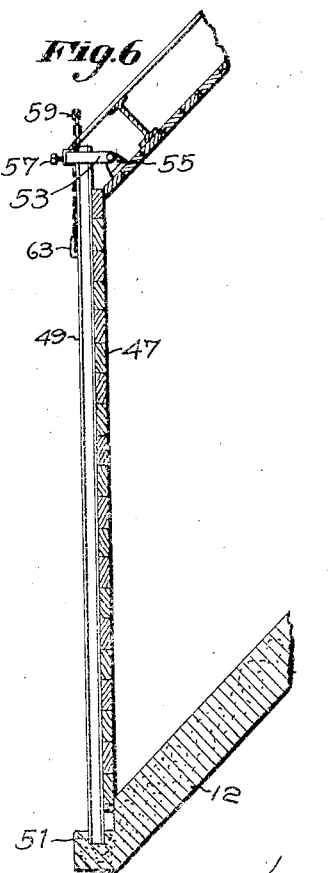

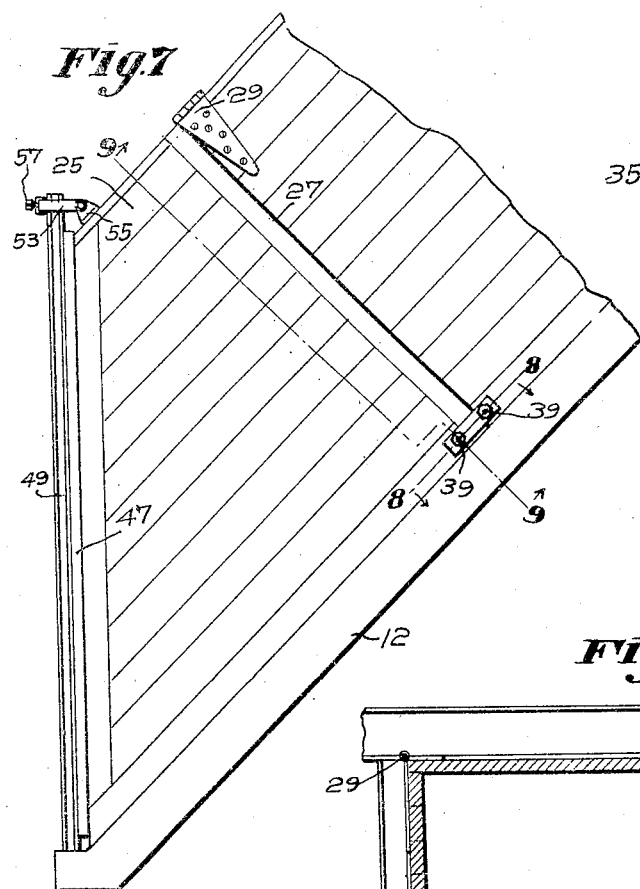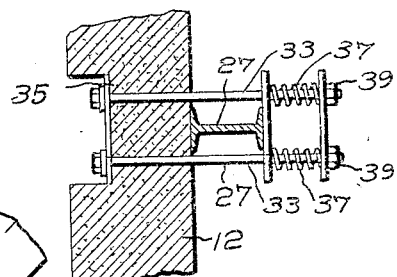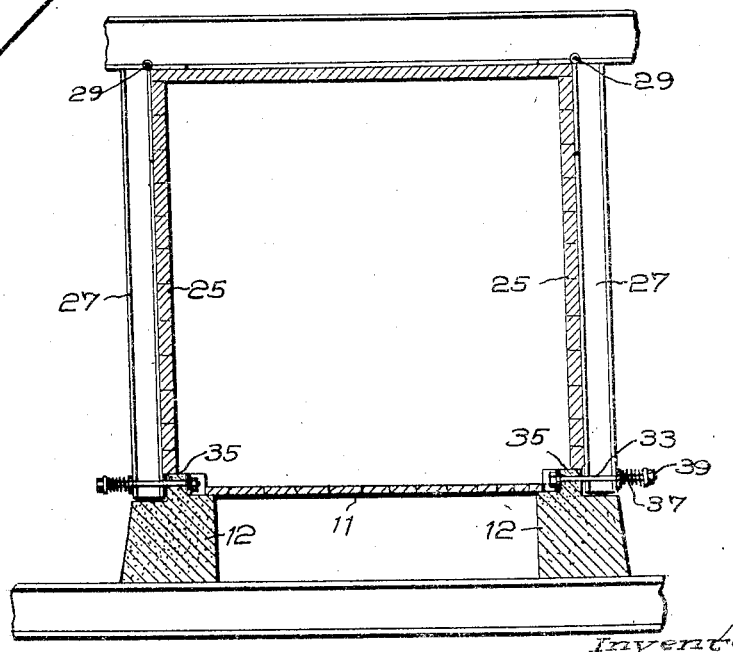

THOMAS J. STURTEVANT, OF WELLESLEY, MASSACHUSETTS, ASSIGNOR TO STURTEVANT MILL COMPANY, OF BOSTON, MASSACHUSETTS, A CORPORATION OF MASSACHUSETTS.

APPARATUS FOR MANUFACTURING ACID PHOSPHATE OR SUPERPHOSPHATE.

1,403,820.   Specification of Letters Patent.   Patented Jan. 17, 1922.

Application filed April 26, 1921. Serial No. 464,545.

*To all whom it may concern:*

Be it known that I, THOMAS J. STURTEVANT, a citizen of the United States, residing at Wellesley, county of Norfolk, and State of Massachusetts, have invented an Improvement in Apparatus for Manufacturing Acid Phosphate or Superphosphate, of which the following description in connection with the accompanying drawings, is a specification, like characters on the drawings representing like parts.

The invention to be hereinafter described relates to apparatus for manufacturing acid phosphate or superphosphate. Phosphate rock as it occurs in nature is unfit for use as a fertilizer on account of insolubility. Therefore, it is necessary to treat the phosphate rock so as to convert the insoluble phosphates therein into soluble phosphates which can be applied to the soil and assimilated by plants. This may be accomplished by mixing the ground phosphate rock with an acid, such, for example, as sulphuric acid.

The mixed ground phosphate rock and dilute acid may be introduced into a den or chamber and allowed to stand therein a sufficient time for the chemical reaction to take place. Then the mixture may be picked down or disintegrated, removed from the den and conveyed to a curing pile where it is allowed to remain a time for the chemical reaction to continue, and further convert insoluble phosphoric acid into soluble phosphoric acid.

The present invention provides an efficient, practical apparatus whereby the mixture of ground phosphate rock and acid may be continuously delivered into a den or chamber. Means may be provided progressively to advance the mixture along the den and present the same to a disintegrator or cutter which breaks down or disintegrates the material, thereby liberating steam or moisture therefrom. Then the disintegrated materials are conveyed to a curing pile.

Noxious fumes accompany the chemical reaction, and are trying and injurious to the workmen. The apparatus of the present invention is designed to enclose the mixture while the chemical reaction takes place, and the disintegration of the materials is accomplished automatically and the noxious fumes and steam are drawn off, making it unnecessary for the workmen to come in contact therewith.

The character of the invention may be best understood by reference to the following description of one good form thereof, shown in the accompanying drawings, wherein:

Fig. 1 is a side elevation of apparatus embodying the invention, certain parts being broken away to disclose parts beyond the same;

Fig. 2 is a vertical longitudinal section through the apparatus;

Fig. 3 on an enlarged scale is a vertical section taken on line 3—3 of Fig. 2;

Fig. 4 is a plan of the apparatus shown in Fig. 1;

Fig. 5 on an enlarged scale is a vertical section taken on line 5—5 of Fig. 2;

Fig. 6 is a vertical section through the lower end portion of the den;

Fig. 7 on an enlarged scale is a side elevation of a lower end portion of the den;

Fig. 8 on an enlarged scale is a sectional detail taken on line 8—8 of Fig. 7; and Fig. 9 is a transverse section through the den taken on line 9—9 of Fig. 8.

Referring to the drawings, the apparatus shown therein as one good form of the invention, comprises a frame for supporting the den, which may be of any suitable character, and in the present instance, comprises uprights 1 (Figs. 1 and 2) conveniently of I-beam form having their lower ends resting on a floor 3 of concrete or other suitable construction. The lower ends of the uprights may be held in proper spaced relation by base struts 5, and their upper ends may carry a horizontal frame 7. The frame may be further strengthened by diagonal braces 9.

The den or chamber, in the present instance, is inclined with respect to the floor 3, and comprises a floor 11 of wood or other suitable material, mounted on and carried by I-beams 13 supported by the frame and an opposed top wall 15 secured to inclined I-beams 17 carried by the frame. This wall 15 may have an upper portion 19 and a lower portion 21 which may be offset outward somewhat from the upper portion 19.

Fixed side walls 23 are provided at the upper end of the den, and extend between the floor and the opposed wall portion 19.

Movable side wall portions 25 may be provided having I-beam ribs 27. The upper ends of the wall portions 25 may be connected by hinges 29 (Figs. 1, 4 and 9) with the upper wall 21.

It is desirable that the wall portions 25 may swing yieldingly outward to reduce the friction between the solid mass which is fed downward through the den, as more fully hereinafter described. To accomplish this, bolts 33 may be entered through flanges 35 extending along the tops of the concrete beams 12, and said bolts may be entered through the wall ribs 27. Coil springs 37 encircle the bolts, and are confined between the ribs 27 and nuts 39 on the bolts. The construction is such that the wall portions 25 are susceptible of a limited yielding outward movement.

The den or chamber has a top 41 (Fig. 2) apertured to receive a pipe 43 adapted to feed the mixture of ground phosphate rock and acid into the den from a mixer of any suitable construction, and therefore, unnecessary to disclose herein. The top is also apertured to receive a pipe 45 which may be connected to a fan or exhauster of usual construction, and therefore, unnecessary to disclose herein. The construction is such that the noxious fumes and steam accompanying the chemical reaction in the upper end of the den may be drawn therefrom through the pipe 45.

The mixture of ground phosphate rock and acid is in the form of a molten or sludge-like mass when introduced into the den, but after the chemical reaction has continued a time, it changes to a spongy mass or solid form. It is, therefore, desirable to provide means to prevent escape of the sludge-like or molten mass from the lower end of the den when the process is started. Afterwards the mass in the lower portion of the den will have hardened sufficiently to plug up the lower end of the den and prevent the escape of the sludge-like or molten mass which is introduced into the upper end of the den above the solid mass.

Therefore, it is desirable to provide a removable door or closure for the lower end of the den. In the present instance, a door 47 (Figs. 2, 5, 6 and 7) is provided having longitudinal ribs 49 conveniently of I-beam form. The lower ends of these ribs may project beyond the door and seat into recesses 51 (Fig. 6) in the concrete beams 12 referred to. The upper ends of the ribs 49 may project beyond the door, and may be secured by yoke latches 53 pivoted to brackets 55 and provided with securing screw bolts 57. A chain 59 (Fig. 5) may have branch portions 61 connected to staples 63 secured to the door. The construction is such that after the lower mass of the mixture has hardened sufficiently, the latches 53 may be released, and the door may be pulled up by the chain 59 and removed from the den.

Preferably the floor 11 is pitched at a predetermined angle, such that the frictional effect between the mass and the floor will be sufficient barely to prevent the mass from sliding down along the floor. The consequence is that the means to move the mass along the floor may operate with a small amount of power.

Any suitable means may be provided to advance the solid mass down along the inclined floor of the den. This means, in the present instance, comprises a pair of endless conveyors conveniently in the form of sprocket chains 65 (Figs. 1 and 2) connecting and guided by a pair of upper sprocket wheels 67 fast on a shaft 69 journalled in bearings 71 (Fig. 1) mounted on the upper frame 7 referred to. Suitable means may be provided to rotate the shaft 71, in the present instance, comprising a worm gear 73 (Fig. 3) fast on the shaft 71 and meshing with and driven by a worm 75 having a shaft journalled in bearings in a casing 79. A pulley 81 fast on the shaft 77 may be driven by a belt from a line shaft or other source of power.

The sprocket chain 65 may be also connected to and guided by lower sprocket wheels 83 on a shaft 85 journalled in bearings 87 (Fig. 1) mounted on cross beams 89 carried by certain of the uprights 1.

The sprocket chains may be provided with lugs or projections 91 at appropriate intervals adapted to engage the mass and positively feed the same downward through the den. The upper run of the sprocket chain may be supported by and slide along the den floor 11.

The floor 11 may terminate short of the lower end of the den. To prevent the sludge or molten mass from flowing down through the space beyond the lower end of the floor 11 at the commencement of the process, hoods 93 may be provided. After the mass has hardened sufficiently to prevent escape of the sludge-like materials down through the opening beyond the lower end of the floor, the hoods 93 may be removed.

Suitable means may be provided to act on and disintegrate the sponge-like or solid mass as the latter is advanced downward through the den. This means, in the present instance, comprises a disintegrator 95 (Figs. 1, 2 and 4) having hubs 97 fast on an upright shaft 99 having its lower end journalled in a step bearing 101 and its upper end journalled in a bearing 103 carried by a bracket frame 105 supported by the main frame. At the upper end of the shaft is a pulley 107 which may be driven by a belt from any suitable source of power.

Arms 109 are secured to the hubs 97 and rings 111 which carry longitudinal members 113 on which knives 115 are secured. These knives preferably are curved, as will be noted in Fig. 4, and may be in staggered relation, as shown in Fig. 1.

The construction is such that the solid mass advanced by the sprocket chain 65 down along the inclined floor 11 of the den, will be presented to the knives 115, and the mass will be progressively and continuously disintegrated or broken down. The character of the knives is such that they not only serve to disintegrate the materials, but also operate with a fan action which desirably aerates the materials.

A baffle wall 117 may be provided at one side of the disintegrator to confine or limit the materials disintegrated and thrown by the knives in the course of the rotation thereof.

Suitable means may be provided to convey the disintegrated materials from the disintegrator to the curing pile or the point desired. This means, in the present instance, is in the form of a pan conveyor 119 which may be located in a recess in the floor beneath the disintegrator. The construction is such that the materials broken up will be deposited on the pan conveyor and may be conveyed by the latter to the curing pile or the point desired.

In operation, the mixture of ground phosphate rock and acid is introduced through the pipe 43 into the upper end of the den while in a molten or semi-liquid condition. At the commencement of the operation, the door 47 is placed in position at the lower end of the den, and the hoods 93 are placed in position above the sprocket chains. The molten or semi-liquid materials flow downward in the den, and build up back of the door 47. After these materials have stood for a while, they will change from molten to solid or spongy form. They will, therefore, plug the lower end of the den and prevent the molten mixture coming into the den from flowing down through the latter. Then the door 47 and the hoods 93 are removed.

The sprocket chains 65 are driven, thereby causing the upper runs thereof to move downward over the floor of the den. The lugs 91 on the sprocket chains will engage the solid mass and slowly feed the same down to the disintegrator. As stated, the pitch or angle of the floor is such that it will be sufficient barely to prevent the mass from sliding along the floor. As a consequence, the power required to overcome the friction between the mass and the floor is small, and the mass may be readily fed to the disintegrator with the speed required. The disintegrator knives will act upon the lower end of the mass and break the same down or disintegrate the same, thereby allowing moisture in the form of steam to escape therefrom. The character of the knives is such that they will desirably serve with a fan action which will aerate the materials. The chemical action occurring in the upper end of the den develops steam and noxious gases. These may be drawn by an exhauster from the den through the pipe 45.

The disintegrated materials will be deflected by the baffle wall 117 down to the pan conveyor 119, and will be conveyed by the latter to the curing pile, where the chemical reaction will continue for a time.

By the operations described, the process may be continuously carried on. That is, the mixture of ground phosphate rock and acid may be continuously introduced into the upper end of the den, the solid mass may be continuously fed down through the den, and the lower end of the mass advanced to the disintegrator may be continuously broken down thereby. The speed of feed of the mass through the den is timed so as to enable the chemical reaction to progress and the materials to change from molten to solid form before reaching the disintegrator. The spring-pressed hinged wall portions may rock outward somewhat, and thereby prevent pressure on the mass such as might interfere with free feed of the mass down through the den to the disintegrator.

The materials while changing from molten to solid form, are enclosed within the den, and the workmen attending the machine are protected from contact therewith.

The apparatus described is simple in construction, efficient in operation, and requires little attention.

It will be understood that the invention is not limited to the specific embodiment shown, and that various deviations may be made therefrom, without departing from the spirit and scope of the appended claims.

What is claimed is:—

1. An apparatus for manufacturing acid phosphate, comprising an inclined den, means to admit the mixture of ground phosphate rock and acid into the upper end of the den, a disintegrator at the lower end of the den, and means for feeding the mixture after it has solidified, down along the inclined den to the disintegrator.

2. An apparatus for manufacturing acid phosphate, comprising an inclined den, means to introduce a mixture of ground phosphate rock and acid into the upper end of the den, a disintegrator at the lower end of the den, and conveyor means travelling through the den to engage the mixture and feed the same after it has solidified to the disintegrator.

3. An apparatus for manufacturing acid phosphate, comprising an inclined den, means to admit the mixture of ground phosphate rock and acid into the upper end of the den, said den having an outlet permitting escape of steam and fumes accompanying the chemical reaction of the materials, a disintegrator adjacent the den, and means to feed the mixture after it has solidified, downward along the inclined den to the disintegrator.

4. An apparatus for manufacturing acid phosphate, comprising an inclined den, a frame supporting said den in inclined position, means to admit a mixture of ground phosphate rock and acid into the upper end of the den, a disintegrator adjacent the den, conveyor means for engaging the materials and for feeding the same after they have solidified downward along the inclined den to the disintegrator, and means for relieving the frictional engagement between the walls of the den and the materials as the latter move downward.

5. An apparatus for manufacturing acid phosphate, comprising an inclined den, means to admit a mixture of ground phosphate rock and acid into the upper end of the den, a disintegrator having cutters and means for moving the cutters horizontally across the lower end of the den, and means to feed the materials after they have solidified, down along the inclined floor of the den to the disintegrator.

6. An apparatus for manufacturing acid phosphate, comprising a den having an inclined floor, means to introduce a mixture of ground phosphate rock and acid into the upper end of the den, a disintegrator at the lower end of the den, and means to feed the materials after they have solidified, continuously down along the inclined floor of the den to the disintegrator.

7. An apparatus for manufacturing acid phosphate, comprising a den having an inclined floor, means to introduce a mixture of ground phosphate rock and acid to the upper portion of the floor, a disintegrator at the lower end of the floor, the inclination of the floor being such as barely to prevent sliding of the materials down along the floor, after they have solidified, and means to feed the solidified materials down along the floor to the disintegrator.

8. An apparatus for manufacturing acid phosphate, comprising a den having an inclined floor, means to admit a mixture of ground phosphate rock and acid to the upper portion of the floor, a disintegrator at the lower end of the floor, and means to feed the materials after they have solidified, down along the inclined floor to the disintegrator, said den having a wall adapted to move outward somewhat to reduce friction on the materials as they are fed down along the floor.

9. An apparatus for manufacturing acid phosphate, comprising a den having an inclined floor, means to admit a mixture of ground phosphate rock and acid into the upper end of the den, a disintegrator adjacent the lower end of the den, and disposed to operate upon a vertical face of the materials, and means to feed the materials after they have changed to spongy mass form, down along the inclined floor to the disintegrator.

10. An apparatus for manufacturing acid phosphate, comprising a den, means to introduce a mixture of ground phosphate rock and acid into the upper end of the den, a disintegrator at the lower end of the den, and an endless conveyor having a run passing through the den for engagement with the materials to feed the materials after changing to spongy mass form to the disintegrator.

11. An apparatus for manufacturing acid phosphate, comprising a den, means to introduce a mixture of ground phosphate rock and acid into the upper end of the den, a disintegrator at the lower end of the den, and endless conveyors having provision for engaging the materials to feed the mass to the disintegrator after change to spongy mass form.

12. An apparatus for manufacturing acid phosphate, comprising a den, means to introduce a mixture of ground phosphate rock and acid into the upper end of the den, a disintegrator at the lower end of the den, an endless conveyor having elements thereon for feeding the materials after change to spongy mass form, down through the den to the disintegrator, and means for driving the endless conveyor including a worm gear and a worm meshing with said gear.

13. An apparatus for manufacturing acid phosphate, comprising a den having an inclined floor, means to introduce a mixture of ground phosphate rock and acid into the upper end of the den, a disintegrator at the lower end of the den, a door adapted to be placed between the lower end of the den and the disintegrator to prevent molten materials from flowing out of the lower end of the den before change to spongy mass form, and means for feeding the mass down through the den to the disintegrator.

14. An apparatus for manufacturing acid phosphate, comprising an inclined den having fixed upper wall portions and yielding lower wall portions, means to admit a mixture of ground phosphate rock and acid into the upper end of the den, a disintegrator at the lower end of the den, and means for feeding the mixture after change to spongy mass form downward through the den to the disintegrator.

15. An apparatus for manufacturing acid phosphate, comprising a den having an inclined floor, means to admit a mixture of ground phosphate rock and acid into the upper end of the den, an upright shaft at the lower end of the den, a disintegrator mounted on said shaft, and means for feeding the materials after change to spongy mass form, down through the den, that the lower end of the mass may be broken down by the disintegrator.

In testimony whereof, I have signed my name to this specification.

THOMAS J. STURTEVANT.